United States Patent [19]

Ueno et al.

[11] Patent Number: 4,466,404
[45] Date of Patent: Aug. 21, 1984

[54] SPLIT ENGINE

[75] Inventors: Makoto Ueno, Shizuoka; Kohei Hori, Susono, both of Japan

[73] Assignee: Toyota Jidosha Kabushiki Kaisha, Toyota, Japan

[21] Appl. No.: 464,783

[22] Filed: Feb. 9, 1983

[30] Foreign Application Priority Data

Oct. 18, 1982 [JP] Japan .................. 57-181459

[51] Int. Cl.³ .......................... F02D 17/02
[52] U.S. Cl. .................. 123/198 F; 123/481; 123/571
[58] Field of Search ............ 123/481, 198 F, 571, 123/568

[56] References Cited

U.S. PATENT DOCUMENTS

| 4,284,056 | 8/1981 | Sugasawa | 123/198 F |
| 4,368,700 | 1/1983 | Sugasawa et al. | 123/481 |
| 4,391,240 | 7/1983 | Sugasawa et al. | 123/481 |
| 4,411,228 | 10/1983 | Sugasawa | 123/481 |

FOREIGN PATENT DOCUMENTS

55-69736  5/1980  Japan .

Primary Examiner—Andrew M. Dolinar
Attorney, Agent, or Firm—Finnegan, Henderson, Farabow, Garrett & Dunner

[57] ABSTRACT

A split engine comprising a plurality of cylinders which are divided into a first cylinder group and a second cylinder group. The second cylinder group is connected to the outside air via a second intake passage. The first cylinder group is connected to a first intake passage which is, in turn, connected to the second intake passage via a shut-off valve. The first intake passage is connected to the exhaust passage of the engine via an exhaust-gas recirculation passage. When the level of the load of the engine becomes high, the exhaust-gas recirculation passage is shut off, and the shut-off valve is initially opened at a high speed and then opened at a low speed.

17 Claims, 14 Drawing Figures

Fig. 1

PRIOR ART

SPLIT ENGINE

BACKGROUND OF THE INVENTION

The present invention relates to a split engine.

Figure 1:
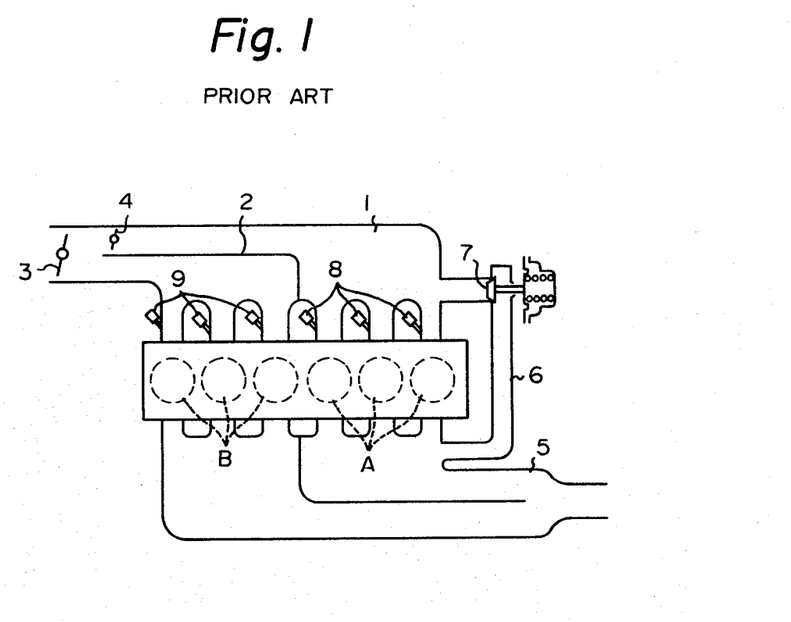
FIG. 1 is a schematically illustrated plan view of a prior art engine.

In an internal-combustion engine in which the load of the engine is controlled by a throttle valve, a specific fuel comsumption deteriorates as the degree of opening of the throttle valve is reduced. Consequently, in order to improve the specific fuel comsumption, a split engine as disclosed in Japanese Unexamined Patent Publication No. 55-69736 has been devised in which, when the engine is operating under a light load, part of the cylinders of the engine are not fired while the remaining cylinders operate under a heavy load. As is illustrated in FIG. 1, in this type of engine, the cylinders are divided into a first cylinder group A and a second cylinder group B, and a first intake manifold 1 and a second intake manifold 2 are connected to the first cylinder group A and the second cylinder group B, respectively. The first intake manifold 1 and the second intake manifold 2 are connected to the outside air via a common throttle valve 3, and a shut-off valve 4 is arranged in the air inlet of the first intake manifold 1. The first intake manifold 1 and an exhaust manifold 5 are interconnected to each other via an exhaust-gas recirculation passage 6, and a recirculation control valve 7 is arranged in the exhaust-gas recirculation passage 6. In the split engine, when the engine is operating under a light load, the injection of fuel by fuel injectors 8 is stopped, and the shut-off valve 4 is closed. In addition, the recirculation control valve 7 is open, and the cylinders of the second cylinder group B operate under a heavy load. Contrary to this, when the engine is operating under a heavy load, the shut-off valve 4 is open, and the recirculation control valve 7 is closed. In addition, fuel is injected by all of the fuel injectors 8 and 9, and, thus, all of the cylinders are fired.

As mentioned above, when the engine is operating under a light load, the shut-off valve 4 is closed, and the recirculation control valve 7 is open. As a result, since the exhaust gas is recirculated into the first cylinder group A via the exhaust-gas recirculation passage 6, it is possible to prevent pumping loss in the first cylinder group A from occurring. In addition, at this time, since the cylinders of the second cylinder group B operate under a heavy load, it is possible to improve the specific fuel consumption.

In such a split engine, however, at the time of changing the number of cylinders to be fired, control of the engine is the most difficult and various problems occur. For example, in the split engine illustrated in FIG. 1, when the operating state of the engine is changed from a light load to a heavy load, since the shut-off valve 4 is abruptly opened, the output torque of the first cylinder group A is abruptly increased, and, thus, a problem occurs in that the drivability of the vehicle deteriorates.

Such a problem can be eliminated by reducing the opening speed of the shut-off valve 4. However, if the opening speed of the shut-off valve 4 is merely reduced, another problem occurs in that the responsiveness of the engine operation to acceleration of the engine deteriorates.

SUMMARY OF THE INVENTION

An object of the present invention is to provide a split engine in which good vehicle drivability can be obtained at the time of changing the number of cylinders to be fired by changing the opening speed of the shut-off valve in response to the operating condition of the engine.

According to the present invention, there is provided a split engine having a plurality of cylinders which are divided into a first cylinder group and a second cylinder group, the engine comprising: a first intake passage having an inlet and an outlet connected to the first cylinder group; a second intake passage having an inlet and an outlet connected to the second cylinder group, the inlet of the first intake passage being connected to the second intake passage and the inlet of the second intake passage being open to the outside air; an exhaust passage connected to the first cylinder group; a manually operated throttle valve arranged in the inlet of the second intake passage; detecting means for detecting the level of the load of the engine and for producing an output signal; electronic control means for producing control signals in response to the output signal of the detecting means; fuel supply means actuated in response to the control signal of the electronic control means for feeding fuel to only the second cylinder group when the level of the load of the engine is lower than a predetermined level and for feeding fuel to all of the cylinders when the level of the load of the engine is higher than the predetermined level; an exhaust-gas recirculation passage interconnecting the exhaust passage to the first intake passage; a recirculation control valve arranged in the exhaust-gas recirculation passage for controlling the flow area of the exhaust-gas recirculation passage; first actuating means operated in response to the control signal of the electronic control means and opening the recirculation control valve when the level of the load of the engine is lower than the predetermined level; a shut-off valve arranged in the inlet of the first intake passage for controlling the flow area of the inlet of the first intake passage; and second actuating means operated in response to the control signal of the electronic control means and initially opening the shut-off valve at a first speed and then opening it at a second speed which is lower than the first speed when the level of the load of the engine becomes higher than the predetermined level.

The present invention may be more fully understood from the description of a preferred embodiment of the invention, set forth below, together with the accompanying drawings.

BRIEF DESCRIPTION OF THE DRAWINGS

In the drawings:

FIG. 4, 4A and 4B are a circuit diagram of the electronic control unit illustrated in FIG. 3;

DESCRIPTION OF THE PREFERRED EMBODIMENT

Figure 2:
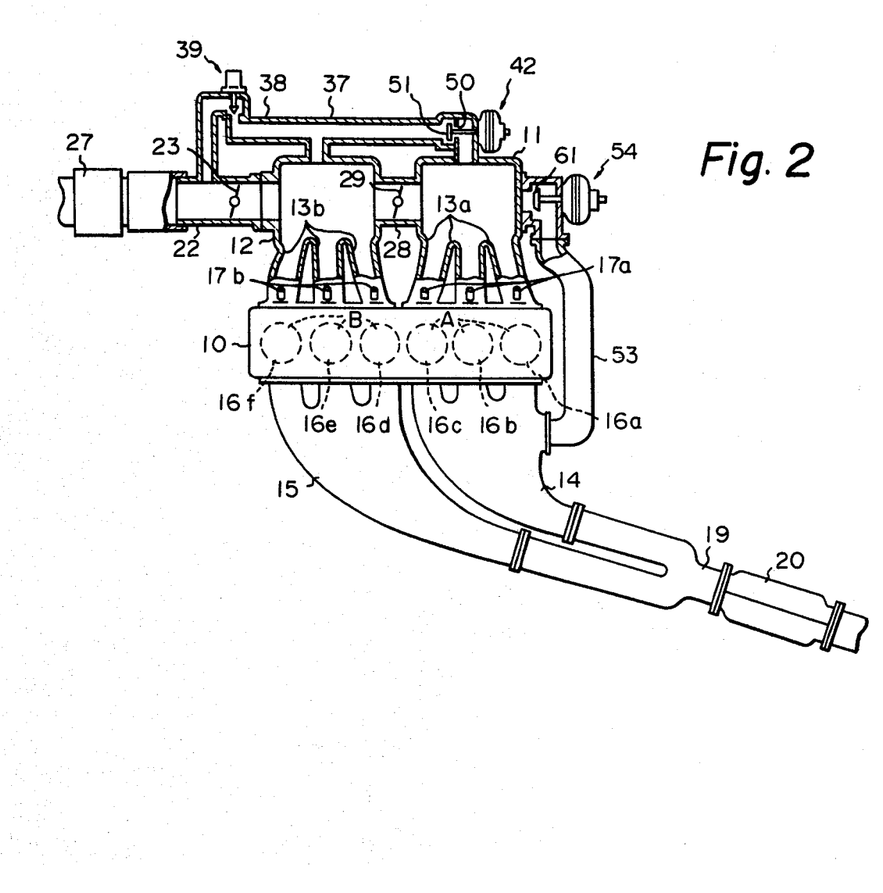
FIG. 2 is a plan view of an engine according to the present invention.

Referring to FIG. 2, reference numeral 10 designates an engine body, 11 a first surge tank, 12 a second surge tank, and 13a separate first pipes connected to the first surge tank 11; 13b designates separate second pipes connected to the second surge tank 12, 14 a first exhaust manifold, and 15 a second exhaust manifold; and 16a, 16b, 16c, 16d, 16e, and 16f designate a No. 1 cylinder, a No. 2 cylinder, a No. 3 cylinder, a No. 4 cylinder, a No. 5 cylinder, and a No. 6 cylinder, respectively. The cylinders 16a, 16b, 16c, 16d, 16e, and 16f are divided into a first cylinder group A consisting of the cylinders 16a, 16b, and 16c and a second cylinder group B consisting of the cylinders 16d, 16e, and 16f.

As is illustrated in FIG. 2, the first surge tank 11 and the first exhaust manifold 14 are connected to the first cylinder group A, and the second surge tank 12 and the second exhaust manifold 15 are connected to the second cylinder group B.

Figure 3:
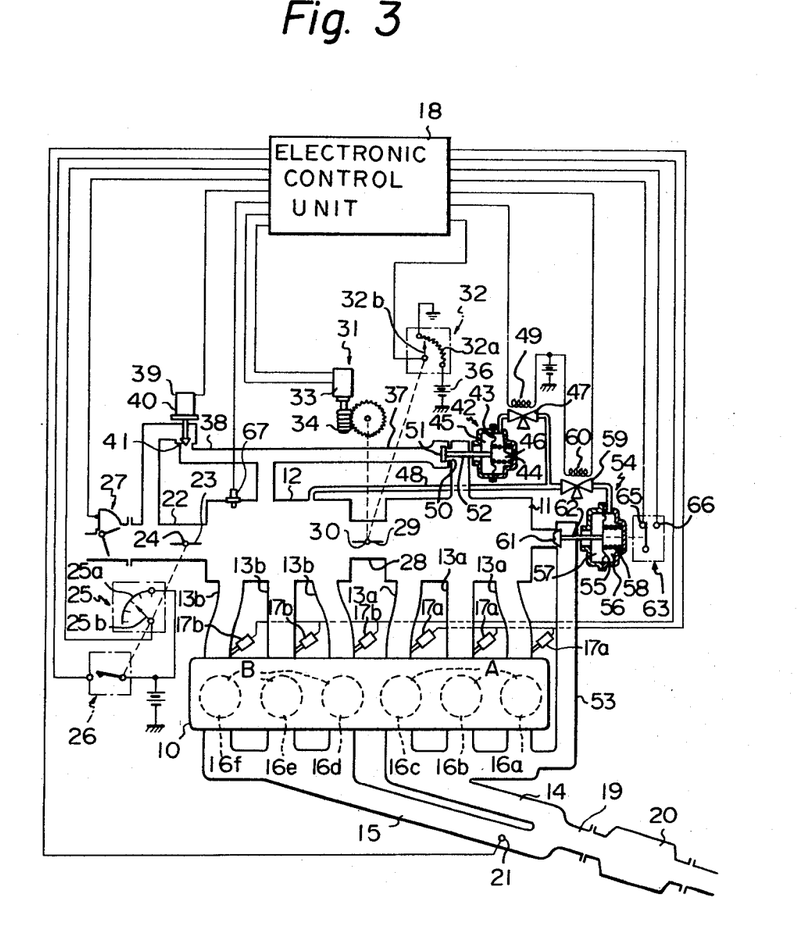
FIG. 3 is a schematically illustrated plan view of the engine illustrated in FIG. 2.

As is illustrated in FIGS. 2 and 3, fuel injectors 17a are mounted on first pipes 13a of the first surge tank 11, and fuel injectors 17b are mounted on second pipes 13b of the second surge tank 12. The solenoids of the fuel injectors 17a and 17b are connected to an electronic control unit 18. The first exhaust manifold 14 and the second exhaust manifold 15 are joined to each other and are connected to a single collection pipe 19. The outlet of the collection pipe 19 is connected to a three-way catalytic converter 20.

As is illustrated in FIG. 3, an oxygen concentration detector 21 (hereinafter referred to as an O₂ sensor) is arranged in the second exhaust manifold 15 and is connected to the electronic control unit 18. An intake duct 22 is attached to the second surge tank 12, and a throttle valve 23 is arranged in the intake duct 22. The throttle valve 23 is connected to the accelerator (not shown). A throttle sensor 25 and an idle switch 26 are connected to a valve shaft 24 of the throttle valve 23. The throttle sensor 25 comprises a comb-shaped stationary terminal 25a and a rotary terminal 25b, which is rotatable together with the throttle valve 23. The throttle sensor 25 produces an output signal every each time the rotary terminal 25b faces one of the teeth of the comb-shaped stationary terminal 25a. Consequently, as the opening speed or the closing speed of the throttle valve 23 is increased, the time interval of the generation of the output signals of the throttle sensor 25 becomes short, and, thus, the opening speed and the closing speed of the throttle valve 23 can be calculated from the output signals of the throttle sensor 25. The idle switch 26 is turned ON when the throttle valve 23 is at idle. The throttle sensor 25 and the idle switch 26 are connected to the electronic control unit 18. An airflow meter 27 is attached to the inlet of the intake duct 22 and is connected to the electronic control unit 18.

The first surge tank 11 and the second surge tank 12 are interconnected to each other via a connecting pipe 28, which is formed in one piece thereon, and a shut-off valve 29 is arranged in the connecting pipe 28. The valve shaft 30 of the shut-off valve 29 is connected, on the one hand, to a drive apparatus 31 and, on the other hand, to a valve position sensor 32. The drive apparatus 31 comprises a DC motor 33, a worm gear 34 fixed to the drive shaft of the DC motor 33, and a worm wheel 35 engaging with the worm gear 34 and fixed to the valve shaft 30 of the shut-off valve 29. Consequently, it will be understood that when the DC motor 33 is operated, the shut-off valve 29 is rotated.

The valve position sensor 32 comprises a stationary resistor 32a and a movable contact 32b, which rotates together with the shut-off valve 29 while contacting the stationary resistor 32a. One end of the stationary resistor 32a is connected to a power source 36, and the other end of the stationary resistor 32a is grounded. Consequently, it will be understood that the voltage, which is proportional to the degree of opening of the shut-off valve 29, is produced at the movable contact 32b. The DC motor 33 and the valve position sensor 32 are connected to the electronic control unit 18.

The first surge tank 11 is also connected to the second surge tank 12 via a bypass pipe 37. In addition, the bypass pipe 37 is connected via an auxiliary air supply pipe 38 to the interior of the intake duct 22 at a position located upstream of the throttle valve 23. A valve unit 39 for controlling the idle speed of the engine is arranged in the auxiliary air supply pipe 38. The valve unit 39 comprises a stepping motor 40 actuated in response to the output signal of the electronic control unit 18 and a flow-control valve 41 driven by the stepping motor 40.

When the engine is idling, the amount of air flowing within the auxiliary air supply pipe 38 is controlled by the flow-control valve 41 so that the idle speed of the engine is kept constant. A bypass control valve apparatus 42 is arranged in the bypass pipe 37. The bypass control valve apparatus 42 comprises a vacuum chamber 44 and an atmospheric pressure chamber 45 which are separated by a diaphragm 43, and a compression spring 46 for biasing the diaphragm 43 is inserted in the vacuum chamber 44. The vacuum chamber 44 is connected to the second surge tank 12 via a first electromagnetic valve 47 and a vacuum conduit 48. In addition, the solenoid 49 of the first electromagnetic valve 47 is connected to the electronic control unit 18. A valve port 50 is formed in the bypass pipe 37, and a valve body 51 for controlling the opening operation of the valve port 50 is arranged in the bypass pipe 37. The valve body 51 is connected to the diaphragm 43 via a valve rod 52.

The first exhaust manifold 14 and the first surge tank 11 are interconnected to each other via an exhaust-gas recirculation passage 53, and a recirculation control valve 54 is arranged in the exhaust-gas recirculation passage 53. The recirculation control valve 54 comprises a vacuum chamber 56 and an atmospheric pressure chamber 57, which are separated by a diaphragm 55, and a compression spring 58 for biasing the diaphragm 55 is inserted in the vacuum chamber 56. The vacuum chamber 56 is connected to the second surge tank 12 via a second electromagnetic valve 59 and the vacuum conduit 48, and the solenoid 60 of the second electromagnetic valve 59 is connected to the electronic control unit 18. A valve body 61 for controlling the flow area of the exhaust-gas recirculation passage 53 is arranged in the exhaust-gas recirculation passage 53 and is connected to the diaphragm 55 via a valve rod 62. In addition, the recirculation control valve 54 is provided with a valve position switch 63. The valve position switch 63 comprises a movable contact 64 connected to the diaphragm 55 and actuated by it and a pair of stationary contacts 65 and 66 which are able to contact the movable contact 64. The stationary contacts 65 and 66 are connected to the electronic control unit 18. The movable contact 64 is connected to the stationary contact 65 when the valve body 61 closes and is connected to the stationary contact 66 when the valve body 61 opens.

As is illustrated in FIG. 3, a vacuum sensor 67 for detecting the level of the load of the engine is arranged in the second surge tank 12 and is connected to the electronic control unit 18. In addition, in order to detect the engine speed, a speed sensor 72 (FIG. 4) is mounted on the engine body 10.

Figure 4A:
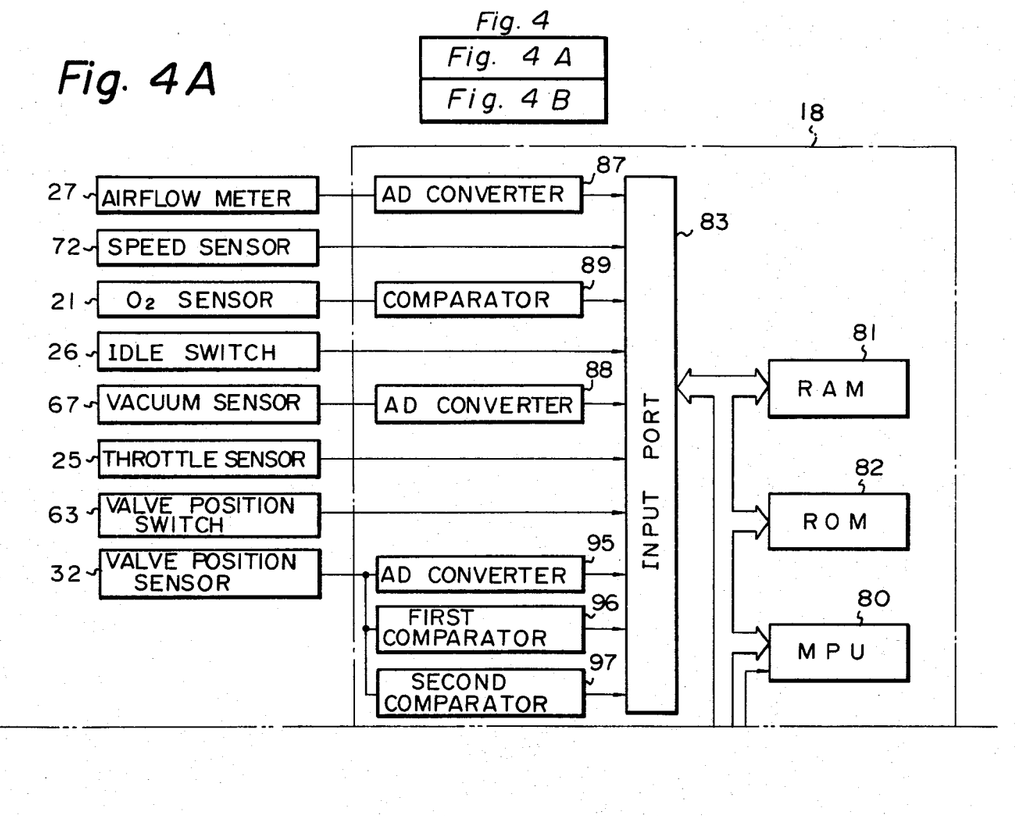
Figure 4B:
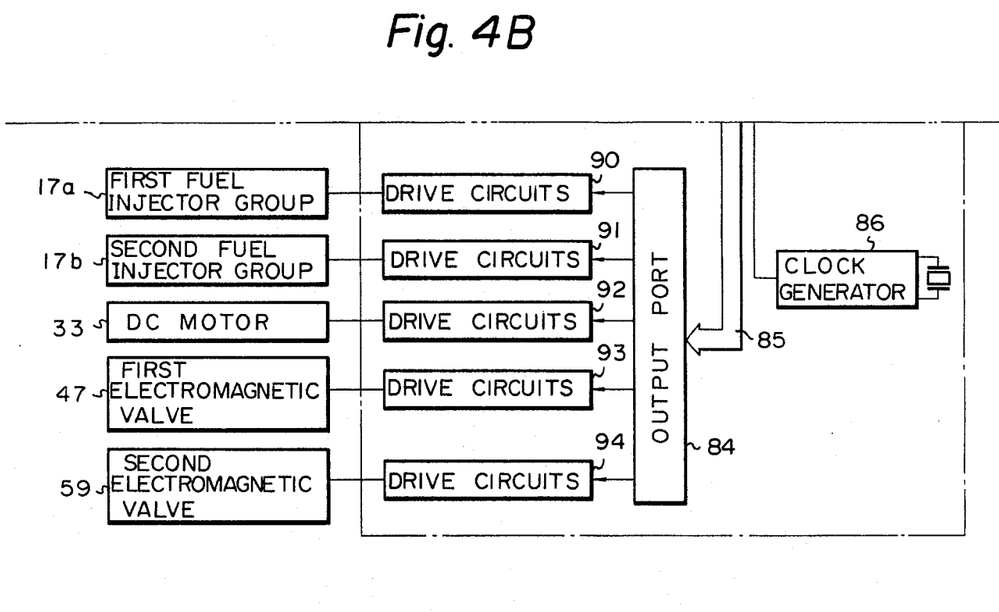

FIG. 4 illustrates the electronic control unit 18. Referring to FIG. 4, the electronic control unit 18 is constructed as a digital computer and comprises a microprocessing unit (MPU) 80 for carrying out arithmetic and logic processing, a random-access memory (RAM) 81, a read-only memory (ROM) 82 for storing a predetermined control program and an arithmetic constant therein, an input port 83, and an output port 84. The MPU 80, the RAM 81, the ROM 82, the input port 83, and the output port 84 are interconnected to each other via a bidirectional bus 85. In addition, the electronic control unit 18 comprises a clock generator 86 for generating various clock signals.

As is illustrated in FIG. 4, the speed sensor 72, the idle switch 26, the throttle sensor 25, and the valve position switch 63 are connected to the input port 83. The airflow meter 27 and the vacuum sensor 67 are connected to the input port 83 via corresponding AD converters 87 and 88, and the O₂ sensor 21 is connected to the input port 83 via a comparator 89. The valve position sensor 32 is connected to the input terminals of an AD converter 95, a first comparator 96, and a second comparator 97, and the output terminals of the AD converter 95, the first comparator 96, and the second comparator 97 are connected to the input port 83.

The airflow meter 27 produces an output voltage which is proportional to the amount of air fed into the intake duct 22. The output voltage of the airflow meter 27 is converted into the corresponding binary code in the AD converter 87 and then the binary code is input into the MPU 80 via the input port 83 and the bus 85. The speed sensor 72 produces continuous pulses at a frequency which is proportional to the engine speed, and the continuous pulses are input into the MPU 80 via the input port 83 and the bus 85. The O₂ sensor 21 produces an output voltage of about 0.1 volts when the air-fuel ratio of the fuel mixture fed into the second cylinder group B becomes larger than the stoichiometric air-fuel ratio and produces an output voltage of about 0.9 volts when the air-fuel ratio of the fuel mixture fed into the second cylinder group B becomes smaller than the stoichiometric air-fuel ratio.

The output voltage of the O₂ sensor 21 is compared with a reference voltage of about 0.5 volts in the comparator 89. At this time, if the air-fuel ratio of the fuel mixture is larger than the stoichiometric air-fuel ratio, an output signal is produced at one of the output terminals of the comparator 89, and if the air-fuel ratio of the fuel mixture is smaller than the stoichiometric air-fuel ratio, an output signal is produced at the other output terminal of the comparator 89. The output signal of the comparator 89 is input into the MPU 80 via the input port 83 and the bus 85.

The vacuum sensor 67 produces an output voltage which is proportional to the level of vacuum in the second surge tank 12. The output voltage of the vacuum sensor 67 is converted to the corresponding binary code in the AD converter 88 and then the binary code is input into the MPU 80 via the input port 83 and the bus 85. The first comparator 96 produces an output voltage when the output voltage of the valve position sensor 32 becomes higher than a predetermined voltage, that is, when the shut-off valve 29 is opened to the maximum extent.

Contrary to this, the second comparator 97 produces an output voltage when the output voltage of the valve position sensor 32 becomes lower than a predetermined voltage, that is, when the shut-off valve 29 is closed. The output signals of the first comparator 96 and the second comparator 97 are input into the MPU 80 via the input port 83 and the bus 85. In addition, the output signals of the idle switch 26, the throttle sensor 25, and the valve position switch 63 are input into the MPU 80 via the input port 83 and the bus 85.

The first fuel injectors 17a, the second fuel injectors 17b, the DC motor 33, the first electromagnetic valve 47, and the second electromagnetic valve 59 are connected to the output port 84 via corresponding drive circuits 90, 91, 92, 93, and 94. Data for actuating the first fuel injectors 17a, the second fuel injectors 17b, the DC motor 33, the first electromagnetic valve 47, and the second electromagnetic valve 59 is written into the output port 84.

Figure 7:
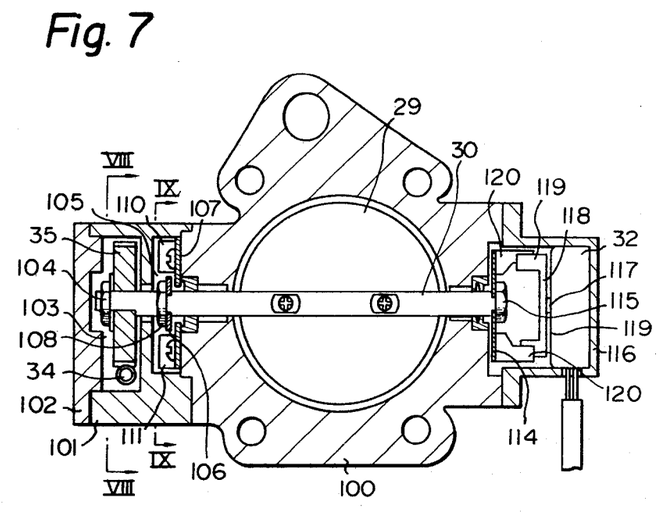
FIG. 7 is a cross-sectional side view of a shut off valve apparatus.
Figure 8:
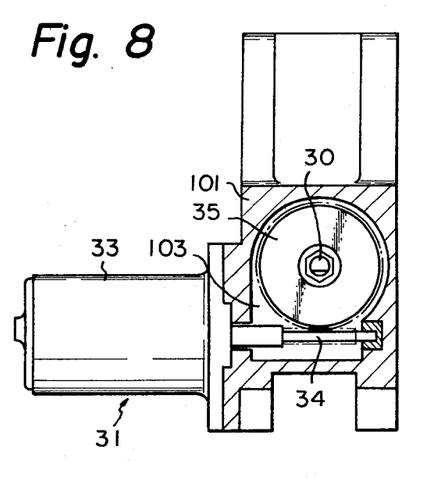
FIG. 8 is a cross-sectional view taken along the line VIII—VIII in FIG. 7.
Figure 9:
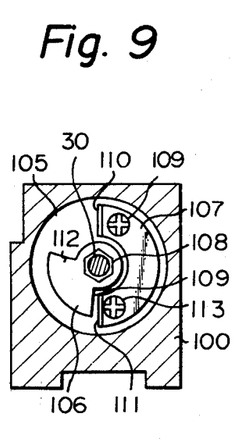
FIG. 9 is a cross-sectional view taken along the line IX—IX in FIG. 7.

FIGS. 7 through 9 illustrate the drive apparatus 31 and the shut-off valve 29 illustrated in FIG. 3. Referring to FIGS. 7 through 9, the valve shaft 30 of the shut-off valve 29 is supported by a housing 100 which forms a portion of the connecting pipe 28 (FIG. 3), and the opposed ends of the valve shaft 30 project outwardly from the housing 100. One end of the valve shaft 30 extends through a drive apparatus housing 101 having an I-shaped cross section and being fixed to the housing 100, and the outer side of the housing 101 is covered by a cover member 102. The worm wheel 35 is arranged in the interior space 103 formed between the housing 101 and the cover member 102 and is fixed to the valve shaft 30 with a nut 104. In addition, the DC motor 33 is fixed to the housing 101, and the worm gear 34, engaging with the worm wheel 35, is fixed to the drive shaft of the DC motor 33. The worm gear 34 and the worm wheel 35 together form a reduction gear.

As is illustrated in FIGS. 7 and 9, an arm 106 and a stop member 107 are arranged in the interior space 105 formed between the housings 101 and 100. The arm 106 has a sector shape and is fixed to the valve shaft 30 with a nut 108. The stop member 107 has an approximately semi-circular shape and is fixed to the housing 100 with a pair of bolts 109. The stop member 107 has at its opposed ends end portions 110 and 111, which are outwardly bent and are arranged so that they are engageable with the sector-shaped arm 106.

The sector-shaped arm 106 and the stop member 107 serve to determine the wide open position and the closed position of the shut-off valve 29. That is, when the end face 112 of the arm 106 abuts against the bent end portion 110, the shut-off valve 29 is in the wide open position and when the end face 113 of the arm 106 abuts against the bent end portion 111, the shut-off valve 29 is in the closed position.

As is illustrated in FIG. 7, an arm 114 is fixed to the end portion of the valve shaft 30, which end portion is located opposite the worm wheel 35, with a nut 115. The arm 114 is covered by a cover member 116 fixed to the housing 100, and the valve position sensor 32 is arranged in the cover member 116. An arm 118 is fixed to a rotary shaft 117 of the valve position sensor 32 and has projecting end portions 119 at the opposed ends thereof. In addition, the arm 114 has, at its opposed ends, projecting end portions 120 which engage with the projecting end portions 119. Consequently, rotation of the valve shaft 30 causes rotation of the rotary shaft 117 of the valve position sensor 32, and, thus, the position of the shut-off valve 29 can be detected by the valve position sensor 32.

Figure 5:
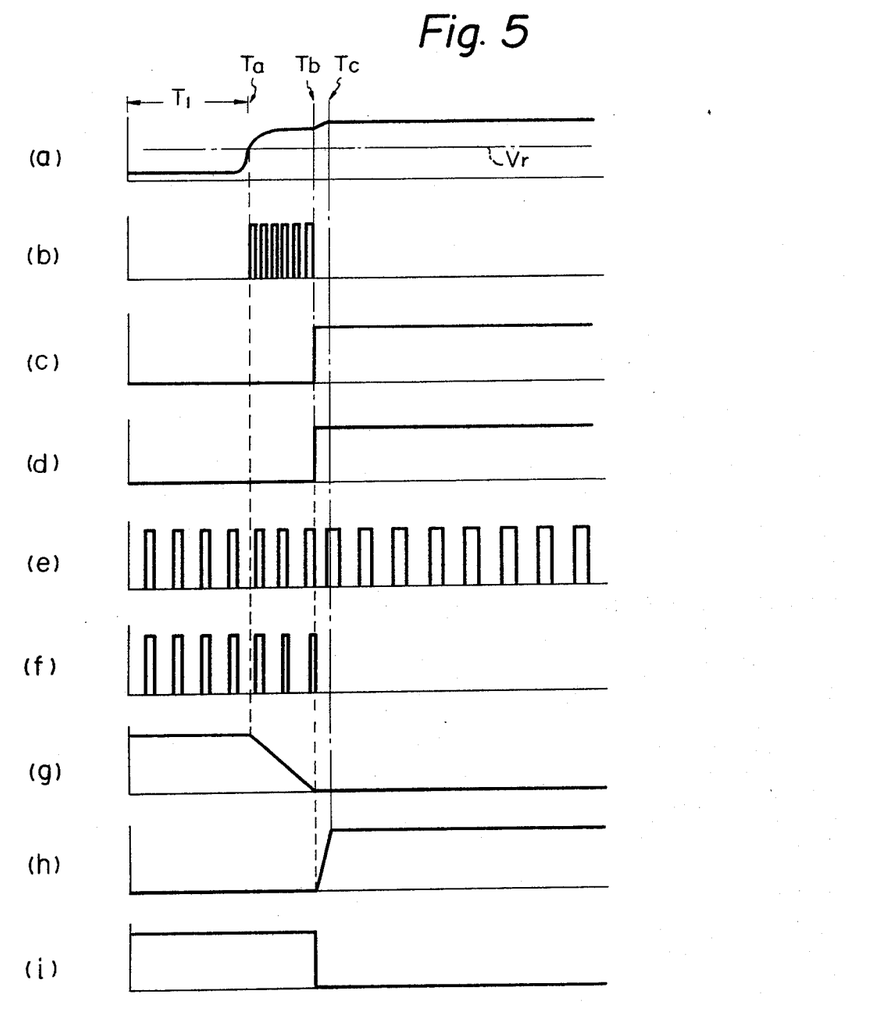
FIG. 5 is a diagram illustrating the control method according to the present invention.
Figure 6:
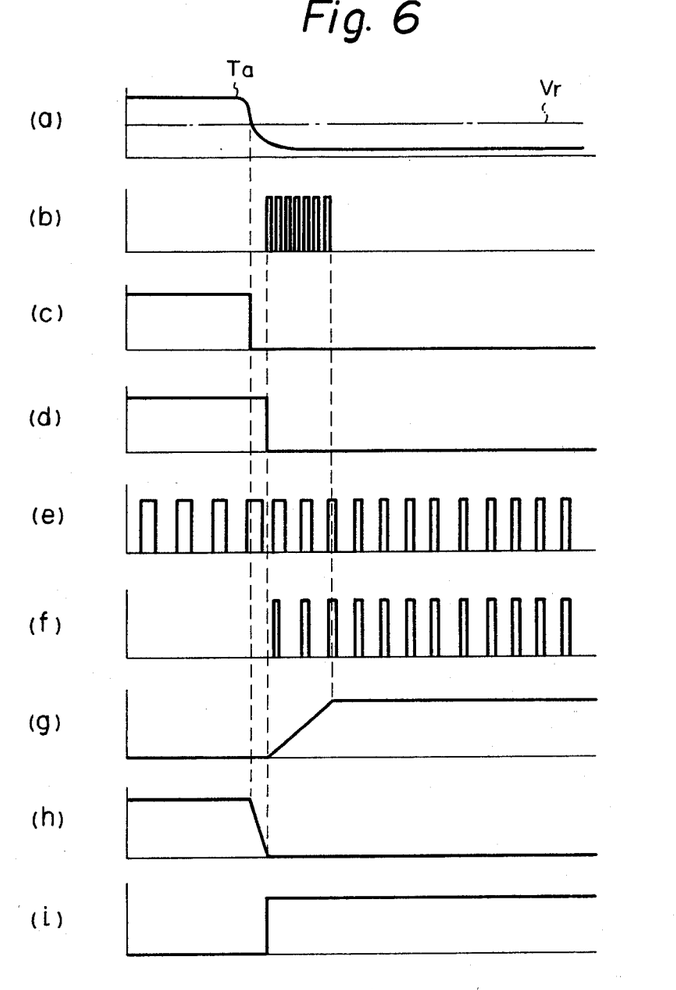
FIG. 6 is a diagram also illustrating the control method according to the present invention.

FIGS. 5 and 6 illustrate the basic operation of the split engine according to the present invention. The basic operation of the split engine is hereinafter described, followed by a detailed description of the operation of the shut-off valve 29.

In FIGS. 5 and 6:

(a) indicates the output voltage of the vacuum sensor 67.

(b) indicates a drive pulse supplied to the DC motor 33.

(c) indicates a control voltage supplied to the solenoid 60 of the second electromagnetic valve 59.

(d) indicates a control voltage supplied to the solenoid 49 of the first electromagnetic valve 47.

(e) indicates a control pulse supplied to the fuel injectors 17b of the second cylinder group B.

(f) indicates a control pulse supplied to the fuel injectors 17a of the first cylinder group A.

(g) indicates the degree of opening of the shut off valve 29.

(h) indicates the degree of opening of the valve body 61 of the recirculation control valve 54.

(i) indicates the degree of opening of the valve body 51 of the bypass control valve apparatus 42.

FIG. 5 illustrates a case wherein the operating state of the engine is changed from a heavy load to a light load, and FIG. 6 illustrates a case wherein the operating state of the engine is changed from a light load to a heavy load.

In FIG. 5, section $T_1$ indicates a state where the output voltage of the vacuum sensor 67 is low, that is, the engine is operating under a heavy load. At this time, the DC motor 33 is not driven, as is illustrated in FIG. 5 (b), and the shut-off valve 29 is in the wide open position, as is illustrated in FIG. 5 (g). In addition, at this time, the solenoid 60 of the second electromagnetic valve 59 is de-energized, as is illustrated in FIG. 5 (c), and, thus, the vacuum chamber 56 of the recirculation control valve 54 is open to the atmosphere via the second electromagnetic valve 59. As a result, the diaphragm 55 moves towards the atmospheric pressure chamber 57, and, thus, the valve body 61 shuts off the exhaust-gas recirculation passage 53, as is illustrated in FIG. 5 (h). Furthermore, at this time, the solenoid 49 of the first electromagnetic valve 47 is de-energized, as is illustrated in FIG. 5 (d), and, thus, the vacuum chamber 44 of the bypass control valve apparatus 42 is open to the atmosphere via the first electromagnetic valve 47. As a result, the diaphragm 43 moves towards the atmospheric pressure chamber 45, and, thus, the valve body 51 of the bypass control valve device 42 opens the valve port 50 to the maximum extent, as is illustrated in FIG. 5 (i).

On the other hand, in section $T_1$ of FIG. 5, the engine speed is calculated in the MPU 80 (FIG. 4) from the output pulse of the speed sensor 72, and, in addition, the basic fuel injection period is calculated in the MPU 80 from the calculated engine speed and the output signal of the airflow meter 27. In a case wherein the three-way catalytic converter 20 is used, as is illustrated in FIG. 3, when the air-fuel ratio of the fuel mixture fed into the second cylinder group B becomes equal to the stoichiometric air-fuel ratio, the purifying efficiency of the three-way catalytic converter 20 reaches a maximum. Consequently, in the MPU 80, the actual fuel injection period is obtained by correcting the basic fuel injection period on the basis of the output signal of the $O_2$ sensor 21 so that the air-fuel ratio of the fuel mixture fed into the second cylinder group B approaches the stoichiometric air-fuel ratio. Data indicating the actual fuel injection period is written into the output port 84, and the control pulse, corresponding to the data and illustrated in FIG. 5 (e) and (f), is supplied to the fuel injectors 17a of the first cylinder group A and the fuel injectors 17b of the second cylinder group B. Consequently, when the engine is operating under a heavy load, fuel is injected from all of the fuel injectors 17a and 17b.

If the operating state of the engine is changed from a heavy load to a light load at the time $T_a$ in FIG. 5, the output voltage of the vacuum sensor 67 is abruptly increased, as is illustrated in FIG. 5 (a). In the MPU 80, when the output voltage of the vacuum sensor 67 exceeds the reference voltage $V_r$ (FIG. 5 (a)), it is determined that the engine is operating under a light load. As a result, a drive signal, that is, the continuous pulses illustrated in FIG. 5 (b), is supplied to the DC motor 33. At this time, the DC motor 33 rotates at a speed which is proportional to the mean voltage of the continuous pulses. As a result, the shut-off valve 29 is gradually opened, as is illustrated in FIG. 5 (g). Then the shut-off valve 29 is closed at the time $T_b$ in FIG. 5. In the MPU 80, if it is determined, on the basis of the output signal of the second comparator 97, that the shut-off valve 29 is closed, various kinds of data, such as data for stopping the injection of fuel by the first fuel injectors 17a, data for increasing the amount of fuel injected by the second fuel injectors 17b, and data for energizing the solenoids 49 and 60 of the electromagnetic valves 47 and 59, is written into the output port 84. As a result, at the time $T_b$ in FIG. 5, the amount of fuel injected by the fuel injectors 17b of the second cylinder group B is increased, as is illustrated in FIG. 5 (e), and the injection of fuel by the fuel injectors 17a of the first cylinder group A is stopped, as is illustrated in FIG. 5 (f). In addition, since the solenoid 49 of the first electromagnetic valve 47 is energized, the vacuum chamber 44 of the bypass control valve apparatus 42 is connected to the second surge tank 12 via the vacuum conduit 48. As a result, the diaphragm 43 moves towards the vacuum chamber 44, and, thus, the valve body 51 closes the valve port 50, as is illustrated in FIG. 5 (i). Furthermore, at the time $T_b$ in FIG. 5, since the solenoid 60 of the second electromagnetic valve 59 is energized, as mentioned above, the vacuum chamber 56 of the recirculation control valve 54 is connected to the second surge tank 12 via the vacuum conduit 48. As a result, since the diaphragm 55 moves towards the vacuum chamber 56, the valve body 61 opens the exhaust-gas recirculation passage 53. This valve body 61 opens to the maximum extent at the time $T_c$ in FIG. 5.

As mentioned above, since the valve body 51 shuts off the bypass pipe 37 as soon as the valve body 61 of the recirculation control valve 54 opens the exhaust-gas recirculation passage 53, there is no danger of the exhaust-gas, which flows into the first surge tank 11 from the exhaust-gas recirculation passage 53, flowing into the second surge tank 12.

In FIG. 6, the time $T_d$ indicates the time at which the operating state of the engine is changed from a light load to a heavy load. At this time, since the solenoid 60 of the second electromagnetic valve 59 is de-energized, as is illustrated in FIG. 6 (c), the valve body 61 of the recirculation control valve 54 shuts off the exhaust-gas recirculation passage 53, as is illustrated in FIG. 6 (h). When the valve body 61 completely shuts off the exhaust-gas recirculation passage 53 and, thus, the movable contact 64 of the valve position switch 63 comes into contact with the stationary contact 65, various types of data, such as data for starting the injection of fuel by the first fuel injectors 17a, as is illustrated in FIG. 6 (f), data for driving the DC motor 33, as is illustrated in FIGS. 6 (b) and (c), and data for energizing the solenoid 49 of the first electromagnetic valve 47, as is illustrated in FIG. 6 (i), is written into the output port 84. Consequently, when the valve body 61 of the recirculation control valve 54 completely shuts off the exhaust-gas recirculation passage 53, the injection of fuel by the first fuel injectors 17a is started, as is illustrated in FIG. 6 (f). In addition, at this time, the shut-off valve 29 gradually opens, as is illustrated in FIG. 6 (g), and the valve body 51 of the bypass control valve apparatus 42 instantaneously opens.

As was mentioned above, in the present invention, the shut-off valve 29 gradually opens or closes. Therefore, since the fluctuation of the output torque of the engine becomes small, it is possible to obtain a good drivability of the vehicle. However, if the shut-off valve 29 is gradually opened at the time of acceleration, the supply of air into the first cylinder group A is delayed, and, thus, a problem occurs in that a good accelerating operation cannot be obtained. Therefore, in the present invention, as is mentioned hereinafter, the shut-off valve 29 is controlled so that the opening speed thereof is increased at the time of acceleration. Nevertheless, even if the opening speed of the shut-off valve 29 is increased at the time of acceleration, certain problems arise. That is, first, when the shut-off valve 29 is in the closed position, a great pressure difference is present between the front side and the rear side thereof. In addition, since the shut-off valve 29 has a relatively large inertia, the start of the action of opening the shut-off valve 29 is delayed. As a result, a problem occurs in that the responsiveness of the engine operation to acceleration of the engine deteriorates. Second, when the shut-off valve 29 is in the closed position, the peripheral edge of the shut-off valve 29 firmly engages with the inner wall of the housing 100. Consequently, if the mean voltage of the drive pulses supplied to the DC motor 33 is reduced in order to slowly open the shut-off valve 29, the DC motor 33 cannot provide a torque, which is necessary to disengage the shut-off valve 29 from the inner wall of the housing 100, for the shut-off valve 29. As a result, another problem occurs in that it is impossible to open the shut-off valve 29. Therefore, in the present invention, in order to eliminate such problems, the DC motor 33 is constructed so that it provides a great torque for the shut-off valve 29 when the operation of opening the shut-off valve 29 is started.

Control of the opening and closing of the shut-off valve 29 is hereinafter described in detail with reference to FIGS. 10 through 12.

Figure 10:
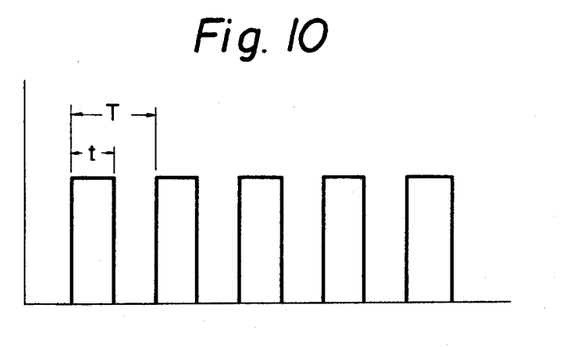
FIG. 10 is a diagram illustrating the drive pulse of a direct current (DC) motor.

FIG. 10 illustrates drive pulses supplied to the DC motor 33. In FIG. 10, t/T is defined as a duty cycle.

Figure 11:
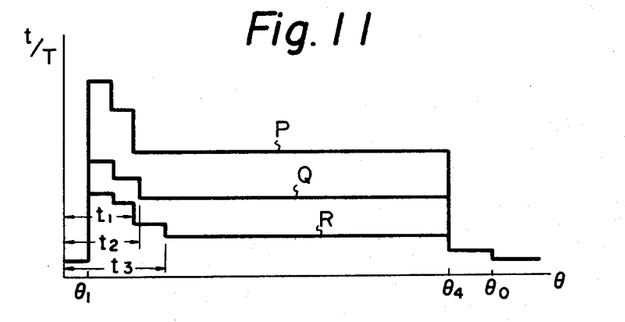
FIG. 11 is a diagram illustrating a change in the duty cycle in a case where the shut-off valve opens.

FIG. 11 illustrates the relationship between the duty cycle t/T and the degree of opening of the shut-off valve 29 in a case where the shut-off valve 29 is opened. In FIG. 11, $\theta_1$ of the abscissa $\theta$ indicates the closed position of the shut-off valve 29, and $\theta_0$ of the abscissa $\theta$ indicates the wide open position of the shut-off valve 29. In addition, the solid line P indicates a case where the opening speed of the throttle valve 23 is high; the solid line R indicates a case where the opening speed of the throttle valve 23 is low; and the solid line Q indicates a case where the opening speed of the throttle valve 23 is an intermediate speed.

From FIG. 11, it will be understood that the duty cycle t/T increases in accordance with an increase in the opening speed of the throttle valve 23. Consequently, as the opening speed of the throttle valve 23 is increased, the mean value of the voltage supplied to the DC motor 33 is increased, and, in turn, the opening speed of the shut-off valve 29 is increased. In addition, from FIG. 11, it will be understood that, during the times $t_1$, $t_2$, and $t_3$, that is, when the shut-off valve 29 is in the initially open state, the duty cycle t/T increases, and, thus, the DC motor 33 provides a great torque for the shut-off valve 29.

When the opening speed of the shut-off valve 29 is high, as indicated by the solid line P in FIG. 11, that is, at the time of acceleration, since the shut-off valve 29 is opened at a high speed, a good accelerating operation can be obtained. In addition, when the opening speed of the shut-off valve 29 is low, as indicated by the solid line R in FIG. 11, the DC motor 33 provides a great torque for the shut-off valve 29 when the operation of opening the shut-off valve 29 is started. Consequently, even if the peripheral edge of the shut-off valve 29 firmly engages with the inner wall of the housing 100, it is definitely possible to open the shut-off valve 29.

When the shut-off valve 29 opens and reaches the wide open position, the arm 106 (FIG. 9) of the shut-off valve 29 abuts against the bent end portion 110 of the stop member 107. Consequently, at this time, if the opening speed of the shut-off valve 29 is high, there is a danger that the stop member 107 will be damaged. Therefore, in the present invention, when the degree of opening of the shut-off valve 29 reaches the degree of opening $\theta_4$, which is slightly smaller than the wide open position $\theta_0$, the duty cycle t/T is reduced, and, in turn, the opening speed of the shut-off valve 29 is reduced, thereby making it is possible to prevent the stop member 107 from being damaged. When the shut-off valve 29 reaches the wide open position, drive pulses having a small duty cycle t/T are continuously supplied to the DC motor 33 so as to maintain the shut-off valve 29 in the wide open position.

Figure 12:
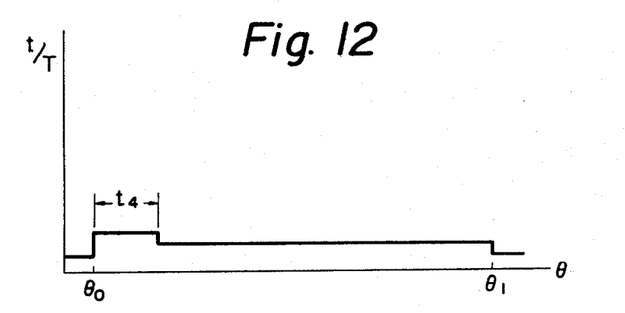
FIG. 12 is a diagram illustrating a change in the duty cycle in a case where the shut-off valve is closed.

FIG. 12 illustrates the relationship between the duty cycle t/T and the degree of opening $\theta$ of the shut-off valve 29 in a case wherein the shut-off valve 29 is closed. As will be understood from FIG. 12, during the time $t_4$, that is, at the time of the start of the operation of closing the shut-off valve 29, the duty cycle t/T is slightly increased. In addition, when the shut-off valve 29 reaches the closed position $\theta_1$, drive pulses having a small duty cycle t/T are continuously supplied to the DC motor 33 so as to maintain the shut-off valve 29 in the closed position.

The relationships between the duty cycle t/T and the degree of opening $\theta$ of the shut-off valve 29, illustrated in FIGS. 11 and 12, is stored in the ROM 82 (FIG. 4) in the form of a function or a data table, and the duty cycle t/T is calculated in the MPU 80 from the above relationship stored in the ROM 82. That is, in the MPU 80, it is determined whether the shut-off valve 29 is in a wide open position or in a closed position on the basis of the output signal of the first comparator 96 and the second comparator 97, respectively. In addition, in the MPU 80, the opening speed of the throttle valve 23 is calculated from the output signal of the throttle sensor 25. Furthermore, a change in the operating state of the engine from a 6-cylinder operating state to a 3-cylinder operating state, or from a 3-cylinder operating state to a 6-cylinder operating state, is determined from the output signal of the vacuum sensor 67. In the MPU 80, the duty cycle t/T is calculated from the above-mentioned relationship illustrated in FIGS. 11 and 12 based on the output signals of the first comparator 96, the second comparator 97, the throttle sensor 25, and the vacuum sensor 67. Data, representing the calculated duty cycle t/T, is written into the output port 84, and the DC motor 33 is driven based on the data.

According to the present invention, the DC motor 33 is controlled so that it provides a great torque for the shut-off valve 29 when the operation of opening the shut-off valve 29 is started. As a result, even when it is desirable that the opening speed of the shut-off valve 29 be low, it is definitely possible to open the shut-off valve 29. In addition, since the shut-off valve 29 instantaneously opens at the time of acceleration, a good accelerating operation can be obtained. Furthermore, since the opening speed of the shut-off valve 29 is reduced before the shut-off valve 29 reaches the wide open position, the impact force acting on the stop member 107 becomes small, thus making it possible to prevent the stop member 107 from being damaged.

While the invention has been described with reference to specific embodiment chosen for the purpose of illustration, it is apparent that numerous modifications could be made thereto by those skilled in the art without departing from the basic concept and scope of the invention.

We claim:

1. A split engine having a plurality of cylinders which are divided into a first cylinder group and a second cylinder group, said engine comprising:
    a first intake passage having an inlet and an outlet connected to said first cylinder group;
    a second intake passage having an inlet and an outlet connected to said second cylinder group, the inlet of said first intake passage being connected to said second intake passage and the inlet of said second intake passage being open to the outside air;
    an exhaust passage connected to said first cylinder group;
    a manually operated throttle valve arranged in the inlet of said second intake passage;
    detecting means for detecting the level of the load of the engine and for producing an output signal;
    electronic control means for producing control signals in response to the output signal of said detecting means;
    fuel supply means, actuated in response to a control signal of said electronic control means, for feeding fuel into only said second cylinder group when the level of the load of the engine is lower than a predetermined level and for feeding fuel into both of said cylinder groups when the level of the load of the engine is higher than the predetermined level;
    an exhaust-gas recirculation passage interconnecting said exhaust passage to said first intake passage;
    a recirculation control valve, arranged in said exhaust-gas recirculation passage, for controlling the flow area of said exhaust-gas recirculation passage;
    first actuating means operated in response to a control signal of said electronic control means and opening said recirculation control valve when the level of the load of the engine is lower than the predetermined level;
    a shut off valve, arranged in the inlet of said first intake passage, for controlling the flow area of the inlet of said first intake passage; and
    second actuating means operated in response to a control signal of said electronic control means and initially opening said shut-off valve at a first speed and then opening it at a second speed which is lower than said first speed when the level of the load of the engine becomes higher than the predetermined level.

2. A split engine according to claim 1, wherein said second actuating means opens said shut-off valve at a third speed which is lower than said second speed when said shut-off valve approaches the wide open position.

3. A split engine according to claim 1, wherein said engine comprises a throttle sensor for detecting the opening speed of said throttle valve and for producing an output signal representing said opening speed, said first speed and said second speed being changed in response to the output signal of said throttle sensor.

4. A split engine according to claim 3, wherein said first speed and said second speed are increased as the opening speed of said throttle valve is increased.

5. A split engine according to claim 1, wherein said second actuating means comprises a DC motor which is actuated by continuous pulses issued from said electronic control means.

6. A split engine according to claim 5, wherein said electronic control means continuously produces said continuous pulses after said shut-off valve assumes the closed position or the wide open position.

7. A split engine according to claim 1, wherein said first actuating means comprises a valve position switch which is actuated in response to the movement of said recirculation control valve and which produces an output signal indicating that said recirculation control valve closes, said second actuating means actuating said shut-off valve in response to the output signal of said valve position switch for starting the operation of opening said shut-off valve after said recirculation control valve closes.

8. A split engine according to claim 7, wherein said first actuating means comprises a vacuum-operated diaphragm apparatus having a diaphragm, said valve position switch being operated in response to the movement of said diaphragm.

9. A split engine according to claim 1, wherein said second actuating means comprises a valve position sensor for detecting the position of said shut-off valve and for producing an output signal indicating that said shut-off valve closes, said first actuating means actuating said recirculation control valve in response to the output signal of said valve position sensor for starting the operation of opening said recirculation control valve after said shut-off valve closes.

10. A split engine according to claim 1, wherein said detecting means is a vacuum sensor arranged in said second intake passage for detecting the level of vacuum in said second intake passage.

11. A split engine according to claim 1, wherein said fuel supply means comprises a first group of injectors arranged in said first intake passage and a second group of injectors arranged in said second intake passage.

12. A split engine according to claim 1, wherein said engine comprises a bypass passage interconnecting said first intake passage to said second intake passage and a bypass control valve arranged in said bypass passage and actuated in response to a control signal of said electronic control means for shutting off said bypass passage when said recirculation control valve opens.

13. A split engine according to claim 12, wherein said first actuating means comprises a valve position switch which is actuated in response to the movement of said recirculation control valve and which produces an output signal indicating that said recirculation control valve closes, said bypass control valve opening in response to the output signal of said valve position switch when said recirculation control valve closes.

14. A split engine according to claim 12, wherein said second actuating means comprises a valve position sensor for detecting the position of said shut-off valve and for producing an output signal indicating that said shut-off valve closes, said bypass control valve shutting off said bypass passage when said shut-off valve closes.

15. A split engine according to claim 12, wherein said bypass control valve comprises a vacuum-operated diaphragm apparatus.

16. A split engine according to claim 12, wherein said engine comprises an auxiliary air supply passage interconnecting said bypass passage to the inlet of said second intake passage, which is located upstream of said throttle valve.

17. A split engine according to claim 16, wherein said auxiliary air supply passage has a control valve arranged therein for maintaining the engine speed at a predetermined speed at idle.

* * * * *